Sept. 11, 1923.  
M. C. HALL  
DEMOUNTABLE RIM  
Filed Dec. 14, 1922  
1,467,852
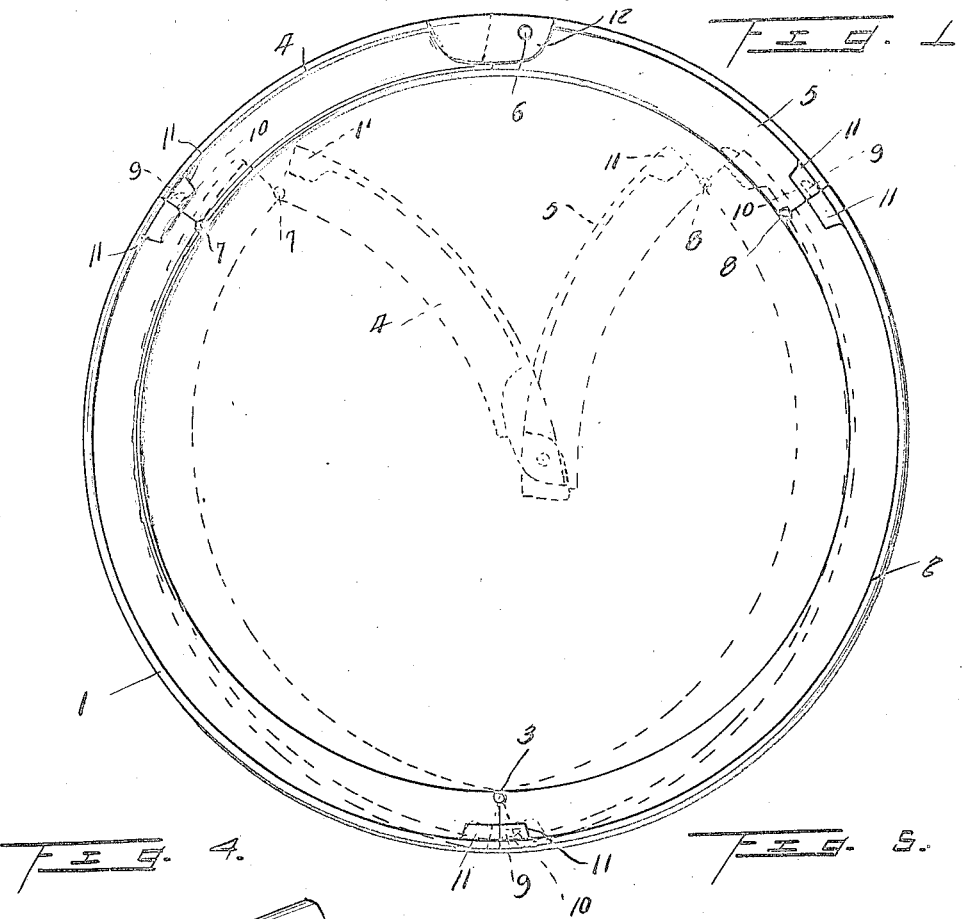
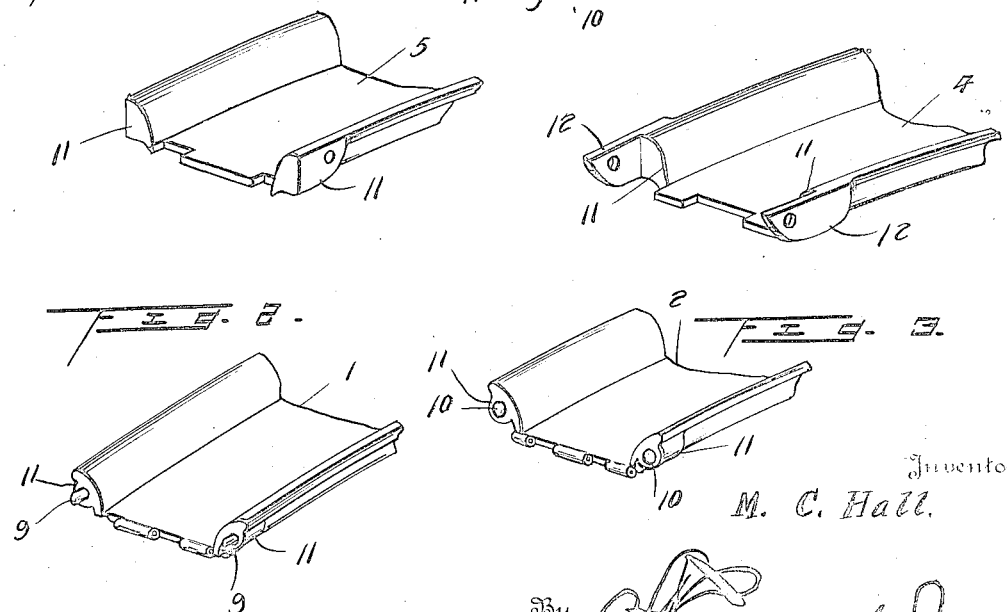
Inventor  
M. C. Hall.  
By  
Attorney Patented Sept. 11, 1923.

1,467,852

UNITED STATES PATENT OFFICE.

MARCELLUS C. HALL, OF WEST MARION, SOUTH CAROLINA.

DEMOUNTABLE RIM.

Application filed December 14, 1922. Serial No. 606,911.

*To all whom it may concern:*

Be it known that I, MARCELLUS C. HALL, a citizen of the United States, residing at West Marion, in the county of Marion and State of South Carolina, have invented certain new and useful Improvements in Demountable Rims; and I do hereby declare the following to be a full, clear, and exact description of the invention, such as will enable others skilled in the art to which it appertains to make and use the same.

The invention has relation to tire supports for vehicle wheels which are usually equipped with pneumatic tires that require to be mounted and dismounted for repairs and replacement.

The present invention provides a demountable rim which is collapsible and formed of sections which are hingedly connected in a manner to admit of readily collapsing or expanding the rim as required, either to dismount or mount a tire.

Other objects and advantages will be apparent and suggest themselves as the nature of the invention is understood.

While the drawings illustrate an embodiment of the invention it is to be understood that in adapting the same to meet different conditions and requirements various changes in the form, proportion and minor details of construction may be resorted to without departing from the nature of the invention.

Referring to the accompanying drawings forming part of the application,

Figure 1 is a side view of a demountable rim embodying the invention, the full lines showing the normal or expanded position of the rim and the dotted lines indicating the position of the rim when collapsed to admit of the mounting or dismounting of a tire as required, Figure 2 is a detail view of the end of a rim section provided with the dowel, Figure 3 is a similar view of the end of a rim section provided with a dowel receiving socket, Figure 4 is a detail view of an end of a break joint rim section, and Figure 5 is a similar view of a coordinate end of the complete break joint rim section.

Corresponding and like parts are referred to in the following description and designated in the several views of the drawings by like reference characters.

The rim comprises similar main sections 1 and 2 which are hingedly connected at 3 and auxiliary or break joint sections 4 and 5 hingedly connected at 6 to each other and at 7 and 8 to the respective sections 1 and 2. The ends of the main sections 1 and 2 remote from the hinge joint 3 are adapted to move inwardly, as indicated by the dotted lines in Figure 1, and the hinge joint 6 of the sections 4 and 5 is adapted to break inwardly and thereby collapse the rim, as shown most clearly by the dotted lines in Figure 1, so that a tire may be readily mounted or dismounted as required. The several sections are hingedly connected by rule joints whereby the expanding movement of the rim is limited, as indicated by the full lines in Figure 1. Each of the hinge joints 3, 7 and 8 is reinforced by means of a dowel 9 which is carried by one of the sections and is adapted to enter a socket 10 of the adjacent section. The dowels brace the hinge joints laterally.

When it is required to mount or dismount a tire, the rim is collapsed by breaking the hinge joint 6 inwardly, thereby drawing the ends of the sections 1 and 2 hinged to the sections 4 and 5 inwardly thereby collapsing the rim, as indicated by the dotted lines in Figure 1, whereby the tire may be readily removed from the rim or placed in position thereon without any liability of pinching the inner tube or displacing a liner or flap which may be used in connection with the tire. After the tire has been placed in position upon the rim, the latter is expanded by moving the hinge joint 6 outwardly, which may be effected by turning the rim to bring the joint 6 in the lowest position and pressing thereon with the foot, whereby to force the joint 6 outwardly whereby the rim is expanded and occupies the position indicated in full lines in Figure 1.

The ends of the several sections have the terminal projections of the flanges enlarged, as indicated at 11, and these enlargements are provided with the dowels 9 and sockets 10. Ears 12 project from the flanges of the break joint section 4 and overlap the flanges of the break joint section 5 to which they are pivoted as shown at 8. The enlargements 11 at the ends of the several sections abut when the rim is expanded as clearly indicated by the full lines in Figure 1.

What is claimed is:

A demountable rim, comprising a plurality of hingedly connected sections having the terminal portions of the flanges enlarged to form abutments, certain enlargements having dowels projecting therefrom to enter sockets in adjacent enlargements, and ears projecting from other enlargements and overlapping and pivoted to the enlargements of the adjacent section.

In testimony whereof I affix my signature in presence of two witnesses.

MARCELLUS C. HALL.

Witnesses:
L. D. LIDE,
H. T. WILLCOX.